US012200600B2

(12) United States Patent
Gopal et al.

(10) Patent No.: US 12,200,600 B2
(45) Date of Patent: Jan. 14, 2025

(54) MANAGING RADIO FREQUENCY (RF) PATHS FOR ANTENNA SWITCH DIVERSITY (ASDIV) USING EXTRACTOR IN NETWORK COEXISTENCE

(71) Applicant: QUALCOMM Incorporated, San Diego, CA (US)

(72) Inventors: Thawatt Gopal, San Diego, CA (US); Michael Lee McCloud, San Diego, CA (US); David Maldonado, San Marcos, CA (US); Joseph David Paulino, San Diego, CA (US); Sridhar Bandaru, Westminster, CO (US); Shriram Gurumoorthy, Denver, CO (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/721,098

(22) Filed: Apr. 14, 2022

(65) Prior Publication Data

US 2022/0345987 A1 Oct. 27, 2022

Related U.S. Application Data

(60) Provisional application No. 63/177,638, filed on Apr. 21, 2021.

(51) Int. Cl.
*H04B 17/336* (2015.01)
*H04L 5/00* (2006.01)
(Continued)

(52) U.S. Cl.
CPC ........ *H04W 40/248* (2013.01); *H04B 17/336* (2015.01); *H04L 5/0051* (2013.01); *H04W 40/16* (2013.01); *H04W 84/12* (2013.01)

(58) Field of Classification Search
CPC ... H04W 40/248; H04W 40/16; H04W 84/12; H04L 5/0051; H04B 17/336
See application file for complete search history.

(56) References Cited

U.S. PATENT DOCUMENTS 7,110,381 B1   9/2006   O'Sullivan et al.
7,505,790 B2   3/2009   Chang et al.
(Continued)

FOREIGN PATENT DOCUMENTS

EP   2774281 A1   9/2014

OTHER PUBLICATIONS

International Search Report and Written Opinion—PCT/US2022/071740—ISA/EPO—Jul. 15, 2022 (12 pp).
(Continued)

*Primary Examiner* — Shukri Taha
(74) *Attorney, Agent, or Firm* — Paul M. McAdams; Shumaker & Sieffert, PA

(57) ABSTRACT

Aspects of the present disclosure relate to wireless communications, and more particularly, to techniques for a UE to determine whether to maintain or remove a radio frequency (RF) path from a set of candidate paths considered for transmit antenna switch diversity (ASDIV). The determination allows the UE to avoid signal loss or degradation in coexisting networks at similar frequency ranges. For example, ASDIV allows two or more antennas to form different input and output ports to establish different RF paths. Coexistent networks, such as wireless wide-area-network (WWAN) and wireless local-area-network (WLAN) may utilize different RF paths to optimize reliability and efficiency. The overlapping of the bands may cause signal attenuation or degradation from at least one of the networks. The present disclosure provides techniques for detecting signal attenuation at least partially caused by (Continued)

overlapping bands and removing an associated RF path to avoid such signal loss or attenuation.

41 Claims, 11 Drawing Sheets

(51) Int. Cl.
*H04W 40/16* (2009.01)
*H04W 40/24* (2009.01)
*H04W 84/12* (2009.01)

(56) References Cited

U.S. PATENT DOCUMENTS

| | | |
|---|---|---|
| 9,143,208 B2 | 9/2015 | Khlat |
| 9,800,443 B2 | 10/2017 | Liu et al. |
| 2001/0012764 A1 | 8/2001 | Edwards et al. |
| 2005/0148306 A1 | 7/2005 | Hiddink |
| 2006/0025171 A1 | 2/2006 | Ly et al. |
| 2009/0316612 A1 | 12/2009 | Poilasne et al. |
| 2011/0319035 A1* | 12/2011 | Lum ............... H04B 1/006 455/73 |
| 2013/0157603 A1 | 6/2013 | Behzad et al. |
| 2014/0169243 A1 | 6/2014 | Khlat et al. |
| 2014/0342678 A1 | 11/2014 | Khlat |
| 2016/0020737 A1 | 1/2016 | Kong et al. |
| 2016/0036508 A1 | 2/2016 | Szini et al. |
| 2017/0126288 A1* | 5/2017 | Sandhu ............... H04B 7/0814 |
| 2017/0179997 A1 | 6/2017 | Liao et al. |
| 2018/0007600 A1 | 1/2018 | Gopal et al. |
| 2018/0069616 A1 | 3/2018 | Kim et al. |
| 2018/0331714 A1* | 11/2018 | See ..................... H04B 7/0814 |
| 2018/0337697 A1 | 11/2018 | Kim et al. |
| 2020/0366320 A1* | 11/2020 | An ..................... H04B 1/0057 |
| 2022/0256444 A1* | 8/2022 | Park ..................... H04W 72/51 |

OTHER PUBLICATIONS

Shoji Y., et al., "70-GHz-Band MMIC Transceiver with Integrated Antenna Diversity System: Application of Receiver- Module-Arrayed Self-Heterodyne Technique", IEEE Transactions on Microwave Theory and Techniques, Nov. 2004, vol. 52, No. 11, pp. 2541-2549.

Wang C-J., et al., "A Pattern-Diversity Antenna Module for Dual-Band WLAN Systems", IEEE 60th Vehicular Technology Conference, 2004, pp. 211-215.

\* cited by examiner

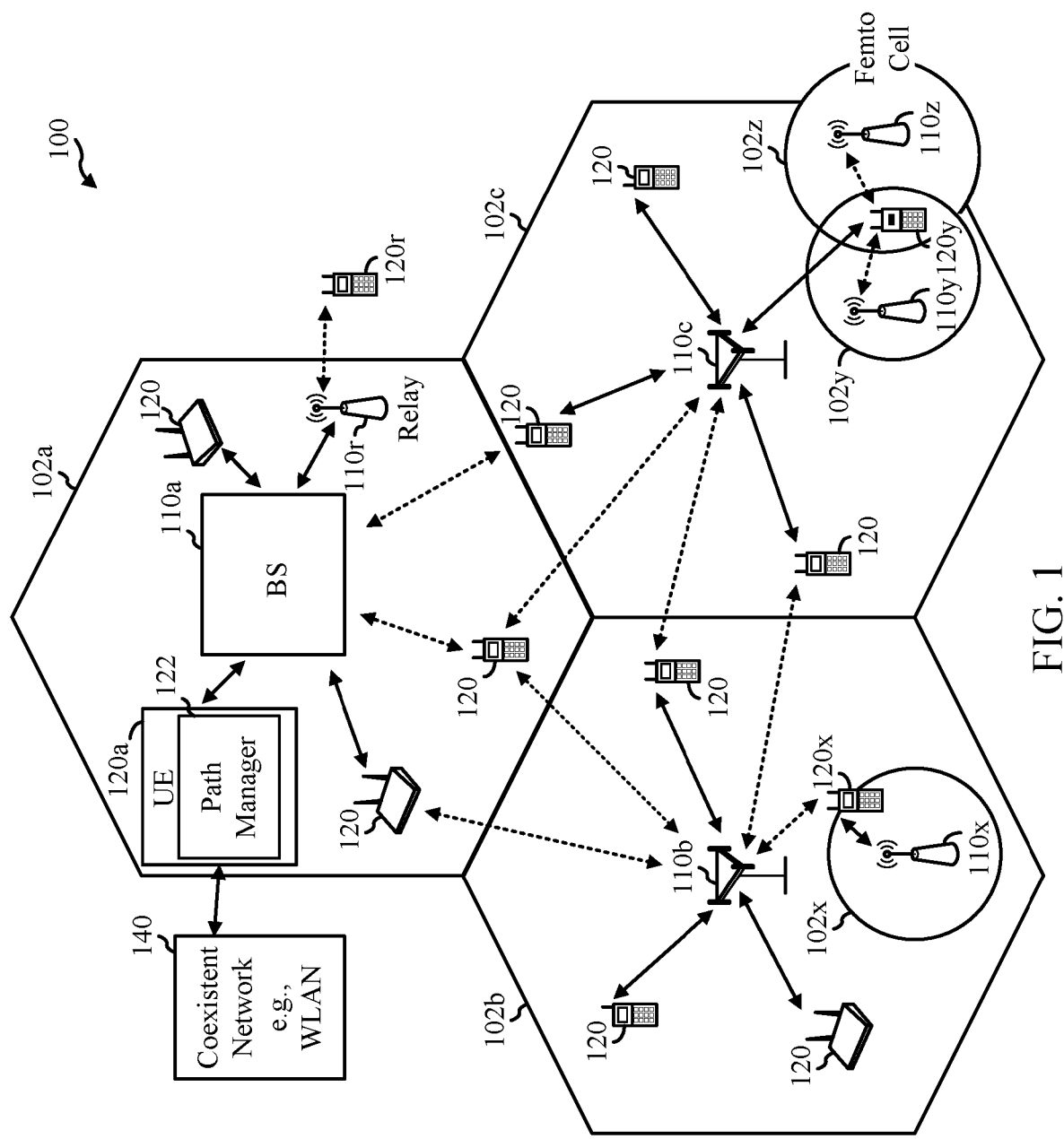
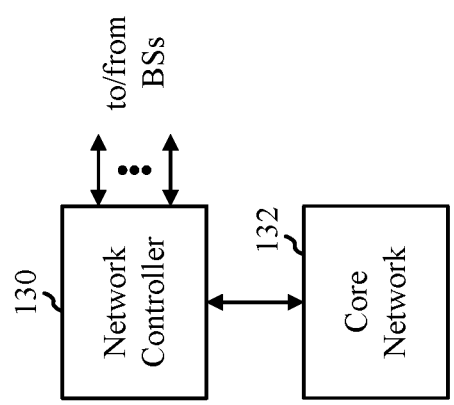
FIG. 1

Cell A
- Source cell
- Configured on N40
- Frequency bandwidth 2300-2370 MHZ
- Performing mobility/handover from Cell A (source) to Cell B (target)
- Antenna Set is full possible antenna set e.g if there are four antennas supported on N40, then set of candidate antennas {1,2,3,4}
- RF extractor device is on antenna path associated with antenna-4

Use-case 1:
If UE on cell-A is on Antenna-4 (Tx Asdiv selected Antenna 4 as best Tx), then after handover to cell B, UE will then re-evaluate best Tx antenna selection from reduced candidate set of antennas {1,2,3}

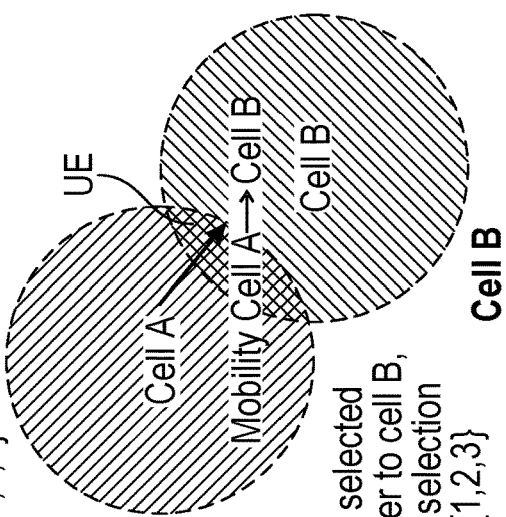

Cell B
- Target Cell
- Configured on N40
- Frequency bandwidth: 2370-2400 MHZ
- Performing mobility/handover from Cell A (source) to Cell B (target)
- Antenna Set is reduced set of candidate antennas {1,2,3}
- RF extractor device is on antenna path associated with antenna 4

FIG. 8

MANAGING RADIO FREQUENCY (RF) PATHS FOR ANTENNA SWITCH DIVERSITY (ASDIV) USING EXTRACTOR IN NETWORK COEXISTENCE

CROSS REFERENCE TO RELATED APPLICATIONS

This application claims benefits of and priority to U.S. Provisional Patent Application No. 63/177,638, filed on Apr. 21, 2021, which is assigned to the assignee hereof and herein incorporated by reference in the entirety as if fully set forth below and for all applicable purposes.

BACKGROUND

Field of the Disclosure

Aspects of the present disclosure relate to wireless communications, and more particularly, to techniques for a UE to manage radio frequency (RF) paths for antenna switching diversity.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes selecting a set of candidate radio frequency (RF) paths to be considered for transmit antenna switch diversity (ASDIV). The method includes detecting that a metric for a first RF path, of the set of candidate RF paths, exceeds a threshold value. The method further includes removing the first RF path from the set of candidate RF paths in response to the detection.

Certain aspects of the disclosure relate to a user equipment (UE). The UE generally includes a memory and a plurality of antennas configured to provide a set of candidate radio frequency (RF) paths to be considered for transmit antenna switch diversity (ASDIV). The UE further includes one or more processors in communication with the memory. The one or more processors are configured to: detect that a metric for a first RF path, of the set of candidate RF paths, exceeds a threshold value; and remove the first RF path from the set of candidate RF paths in response to the detection.

Certain aspects of the disclosure relate to an apparatus for wireless communications by a user equipment (UE). The apparatus generally includes means for selecting a set of candidate radio frequency (RF) paths to be considered for transmit antenna switch diversity (ASDIV); means for detecting that a metric for a first RF path, of the set of candidate RF paths, exceeds a threshold value; and means for removing the first RF path from the set of candidate RF paths in response to the detection.

Aspects of the present disclosure also provide various apparatuses, means, and computer readable including instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

FIG. 8 illustrates an example scenario of a moving UE selecting antennas when handed over from a first cell to a second cell, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
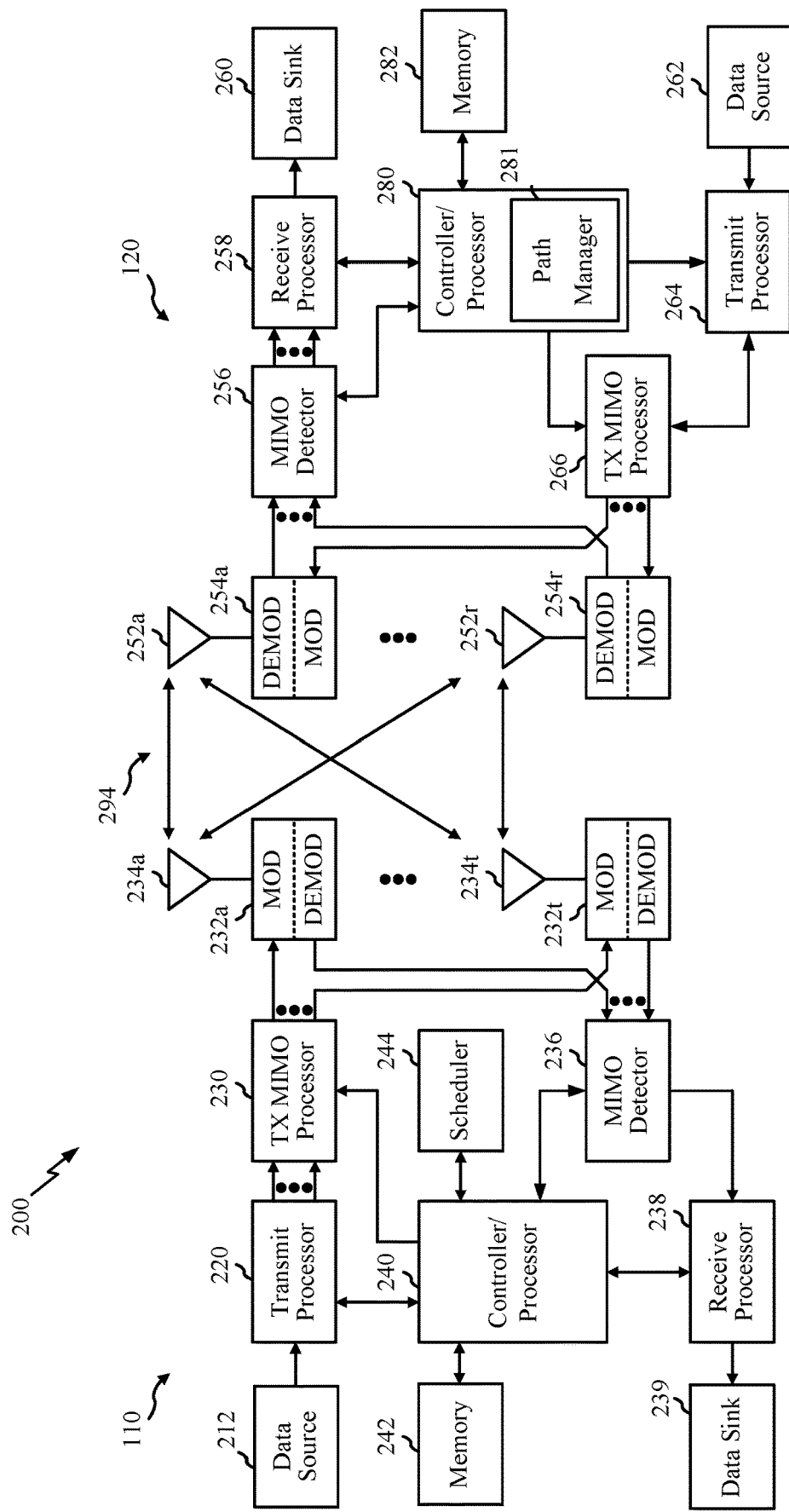
FIG. 2 is a block diagram conceptually illustrating a design of an example base station (BS) and user equipment (UE), in accordance with certain aspects of the present disclosure.

Aspects of the present disclosure relate to wireless communications, and more particularly, to techniques for a UE to determine whether to maintain or remove a radio frequency (RF) path from a set of candidate paths considered for transmit antenna switch diversity (ASDIV). In some cases, the determination may allow the UE to avoid signal loss or degradation in coexisting networks at similar frequency ranges.

For example, ASDIV allows two or more antennas to form different input and output ports to establish different RF paths. Coexistent networks, such as wireless wide-area-network (WWAN) and wireless local-area-network (WLAN) may utilize different RF paths to optimize reliability and efficiency. However, the WWAN and WLAN may use certain bandwidths that are partially overlapped. The overlapping of the bands may cause substantial signal loss or degradation in receiving signals from at least one of the networks. The present disclosure provides techniques for detecting signal attenuation at least partially caused by overlapping bands and removing an associated RF path to avoid such signal loss or attenuation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 in the wireless communication network 100 may include a path manager 122 configured to perform (or assist the UE 120 in performing) operations 700 described below with reference to FIG. 7.

The UE 120 may communicate with the base station (BS) 110a and one or more coexistent network 140. In some cases, the BS 110 may provide WWAN radio access technology (RAT), including, for example, LTE or NR sub-6 licensed bands. The coexistent network 140 may provide WLAN RAT including at least one of, for example, an industrial, scientific, and medical (ISM) radio band network or a near-field or short range communication network (e.g., Bluetooth 2.4 GHz). The coexistent network 140 may operate in at least partially overlapping frequency bands as the BS 110.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 may be configured (or used to implement a path manager 281) to perform operations 700 of FIG. 7. Similarly, antennas 234, processors 220, 220, 238, and/or controller/processor 240 of the BS 110 may be configured (or used) to complement the operations 700 performed by the UE 120.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 220 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DE-MODs) in transceivers 254a through 254r, respectively. Each demodulator 254 may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, de-interleave, and decode) the detected symbols, provide decoded data for the UE 120 to a data sink 260, and provide decoded control information to a controller/processor 280.

In a MIMO system, a transmitter (e.g., BS 120) includes multiple transmit antennas 254a through 254r, and a receiver (e.g., UE 110) includes multiple receive antennas 252a through 252r. Thus, there are a plurality of signal paths 294 from the transmit antennas 254a through 254r to the receive antennas 252a through 252r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the B S 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
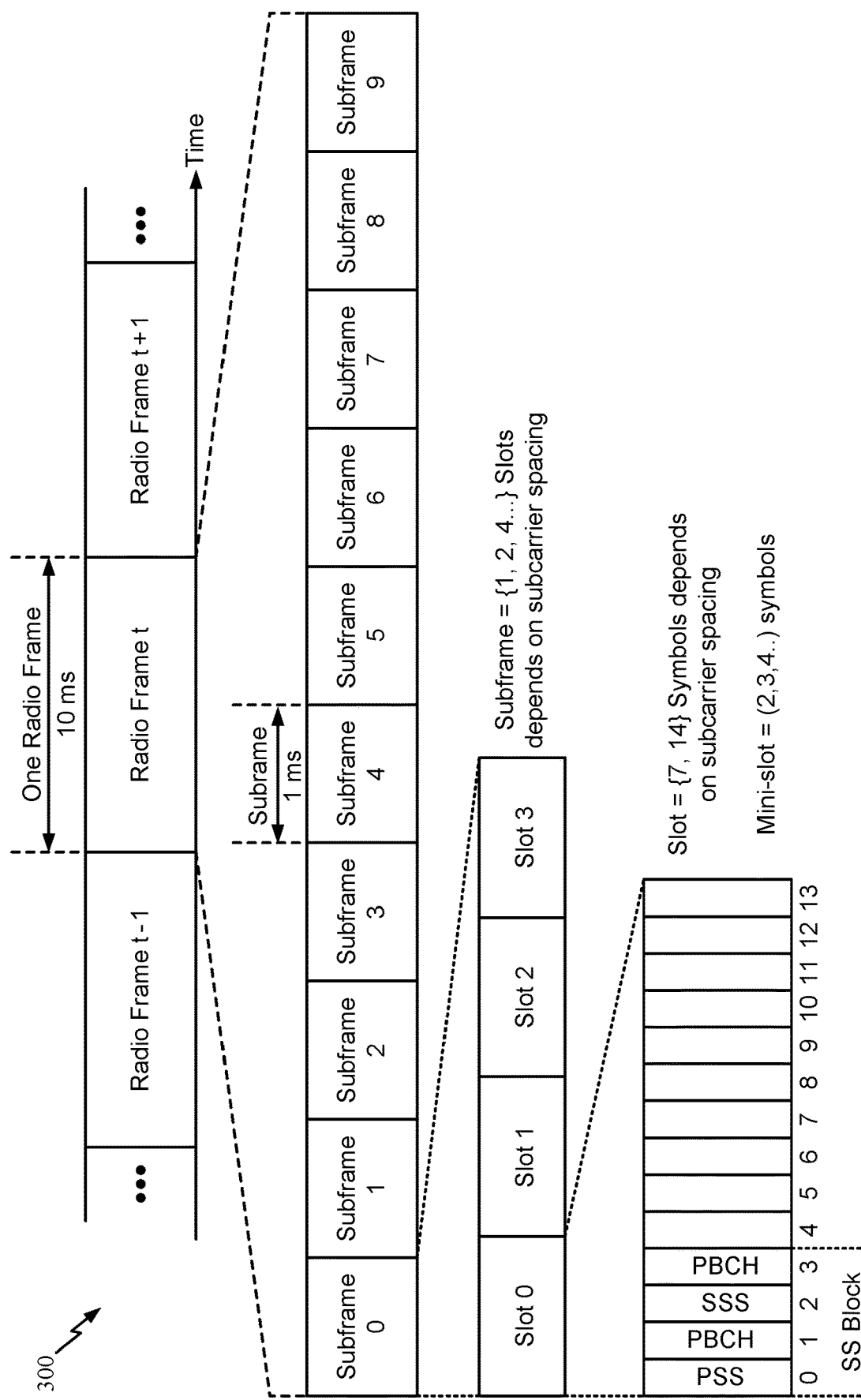
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Antenna Switch Diversity (ASDIV) and Radio Frequency (RE) Paths

Figure 4:
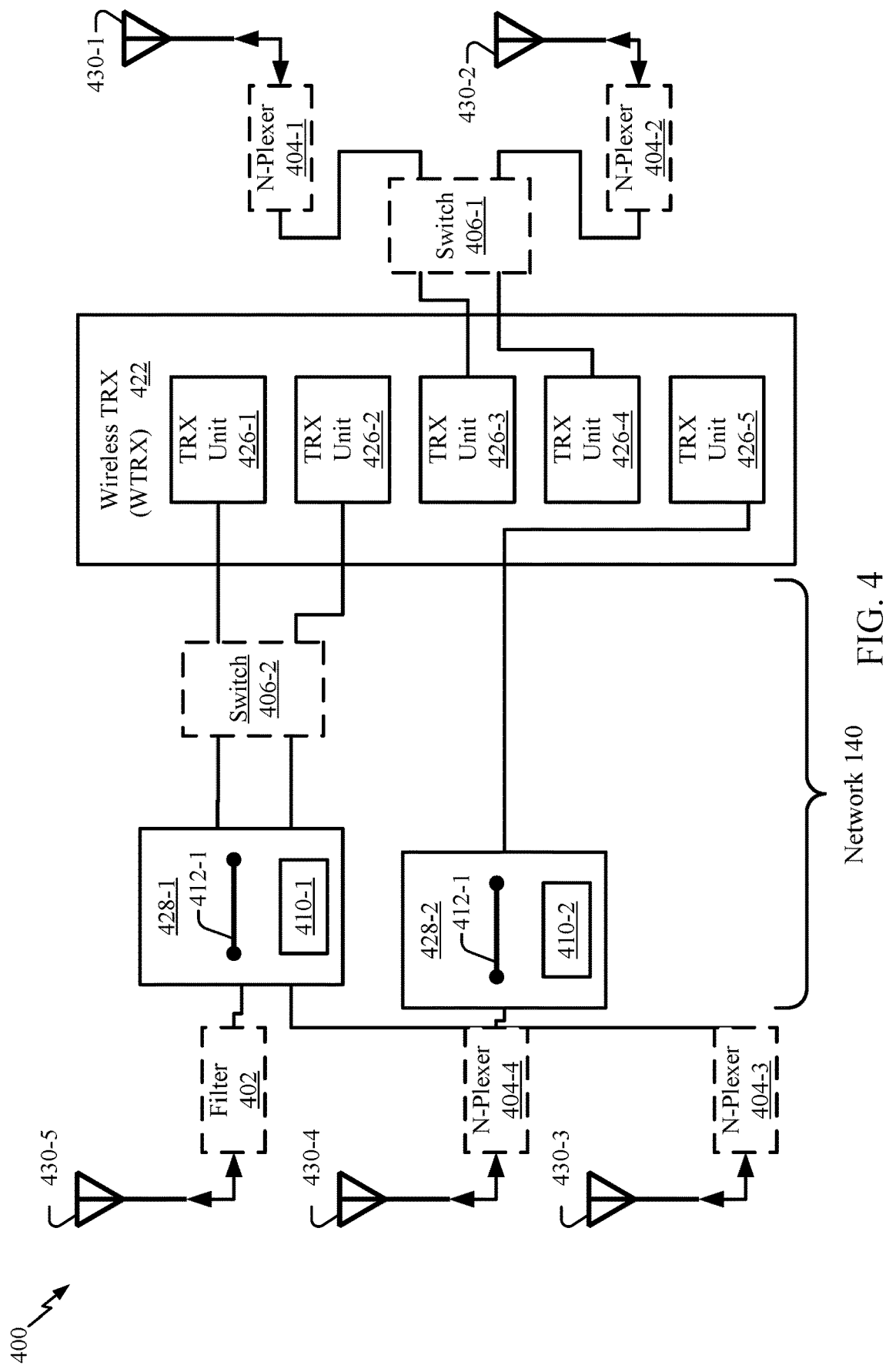
FIG. 4 illustrates a portion of an electronic device having multiple antennas operating with multiple wireless protocols and including a first and second switched filter, in accordance with certain aspects of the present disclosure.

FIG. 4 illustrates a portion of an electronic device 400 having multiple antennas operating with multiple wireless protocols and including a first and second switched filter, in accordance with certain aspects of the present disclosure. The electronic device may be an example of the UE 120 of FIGS. 1 and 2. In addition to including the various components illustrated in FIG. 2, the electronic device 400 may further include the one or more components shown in FIG. 4. For example, the electronic device 400 may also include input/output ports (I/O ports) that enable data exchanges or interaction with other devices, networks, or users. The I/O ports may include serial ports (e.g., universal serial bus (USB) ports), parallel ports, audio ports, infrared (IR) ports, and so forth.

For communication purposes, the electronic device 400 also includes a wireless transceiver 422 coupled with a modem (not shown), a switched filter and controller 428, and one or more antennas 430-n. The wireless transceiver 422 provides connectivity to respective networks and other electronic devices connected therewith using radio-frequency (RF) wireless signals. Additionally or alternatively, the electronic device 400 may include a wired transceiver, such as an Ethernet or fiber optic interface for communicating over a personal or local network, an intranet, or the Internet.

The wireless transceiver 422 may facilitate communication over any suitable type of wireless network, such as a wireless local area network (LAN) (WLAN) such as Wi-Fi or Bluetooth (or an equivalent near-field communication network), a peer-to-peer (P2P) network, a mesh network, a cellular network, a wireless wide-area-network (WWAN) such as 3GPP2 LTE or 5G NR, a navigational network (e.g., the Global Positioning System (GPS) of North America or another Satellite Positioning System (SPS)), and/or a wireless personal-area-network (WPAN). In the context of the example environment 100, the wireless transceiver 422 enables the electronic device 400 to communicate with the base station 104 and networks connected therewith. Other figures referenced herein may pertain to other wireless networks.

The modem of the electronic device 400, such as a baseband modem, may be implemented as a system on-chip (SoC) that provides a digital communication interface for data, voice, messaging, and other applications of the electronic device 400. The modem may also include baseband circuitry to perform high-rate sampling processes that can include analog-to-digital conversion (ADC), digital-to-analog conversion (DAC), gain correction, skew correction, frequency translation, and so forth. The modem may also include logic to perform in-phase/quadrature (I/Q) operations, such as synthesis, encoding, modulation, demodulation, and decoding. More generally, the modem may be realized as a digital signal processor (DSP) or a processor that is configured to perform signal processing to support communications via one or more networks. Alternatively, ADC or DAC operations may be performed by a separate component or another illustrated component, such as the wireless transceiver 422.

The wireless transceiver 422 can include circuitry, logic, and other hardware for transmitting or receiving a wireless signal for at least one communication frequency band. In operation, the wireless transceiver 422 can implement at least one radio-frequency transceiver unit to process data and/or signals associated with communicating data of the electronic device 400 via the antenna 430. Generally, the wireless transceiver 422 can include filters, switches, amplifiers, and so forth for routing and processing signals that are transmitted or received via the antenna 430. As shown, the wireless transceiver 422 includes at least one converter unit (e.g., for ADC or DAC operations) and at least one transceiver (TRX) unit 426. But generally, the wireless transceiver 422 includes multiple transceiver units (e.g., for different wireless protocols such as WLAN versus WWAN or for supporting different frequency bands or frequency band combinations).

In some cases, components of the wireless transceiver 422, or a transceiver unit 426 thereof, are implemented as separate receiver and transmitter entities. Additionally or alternatively, the wireless transceiver 422 can be realized using multiple or different sections to implement respective receiving and transmitting operations (e.g., using separate transmit and receive chains). Example implementations of a transceiver unit 426 are described below with reference to FIG. 4. Further, example implementations of a switched filter 428 and a switched filter controller, including interactions with the wireless transceiver 422 and the associated modem, are described herein. At least a portion of the switched filter controller may be implemented by the modem. In addition, different wireless protocols such as WWAN and WLAN may be implemented on separate chips or as separate SoCs. As such, the blocks such as the modem and transceiver 422 may represent more than one modem or transceiver implemented either together on separate chips or separate SoCs.

In some implementations, there may be communication signals transmitted either between different transceiver units or between different modem segments to alert each other about communication events. For example, there may be high speed GPIO pins between a WWAN transceiver unit 426-1 and WLAN transceiver unit 426-n that may be referred to as coexistence pins. When one transceiver unit 426-n is becoming operational (e.g., about to transmit or about to receive in order to establish a channel or for other purposes), the coexistence pin may be used to send a signal alerting the other transceiver unit 426-n. The switched filter controller may receive signals on the coexistence pins to determine whether to switch between the bypass signal path or the filtered signal path based on the signals (e.g., RF path switch or selection). In this case, the switched filter controller is configured to selectively connect the transceiver unit 426-1 to the antenna 430 via the bypass signal path or via the filtered signal path based further on a signal from a second transceiver unit 426-n indicating a transmission or reception associated with a rejection band of the filter 410. For example, based on a signal from the coexistence pin from the WLAN transceiver unit 426-n, the switched filter controller may determine to switch to the filtered signal path in order to ensure the WLAN transceiver unit 426-1 is free of interference when transmitting or receiving a preliminary communication for establishing a channel. The coexistence pin may be faster than messaging between modems, which may have some latency.

As such, in general, the wireless communications apparatus may include a second transceiver unit 426-n and the switched filter controller is configured to cause the switching circuitry 202 to selectively connect the transceiver unit 426-1 to the antenna 430 via the bypass signal path or via the filtered signal path based further on information from the second transceiver unit 426-n. The information from the second transceiver unit 426-1, among other parameters may include information indicative of an operational frequency band of a second signal different than the carrier signal, or a location of a center frequency of the second signal within the operational frequency band, or a power level of the second signal, or some combination thereof.

An electronic device may have more than one switched filter 428. FIG. 4 illustrates a portion of an electronic device 400 having multiple antennas operating with multiple wireless protocols. As shown in FIG. 4, the electronic device 400 includes multiple antennas 430, at least one filter 402, at least one N-plexer 404, at least one switch 406, and at least one wireless transceiver 422, in addition to a first switched filter 428-1 and a second switched filter 428-2. Optional elements are shown with dashed lines. These components are interconnected using multiple electrically-conductive lines (e.g., wires or traces). As illustrated, the electronic device includes five antennas 430-1, 430-2, 430-3, 430-4, and 430-5. However, an electronic device 400 may have more or fewer antennas. Each respective antenna 430 is optionally coupled to a respective filter 402 or N-plexer 404. Thus, five total filters or N-plexers are coupled to the five antennas 430-1 . . . 430-5. N-plexers can include diplexers, triplexers, and so forth. An N-plexer can enable multiband antenna sharing with other modules that operate in different bands (e.g., 800 MHz, mid band (such as 1700-2200 MHz), and 5 GHz). To do so, each N-plexer includes two or more filter units configured to attenuate frequencies that are to be blocked from further propagation. Thus, a triplexer may include a high pass filter unit (e.g., for 5150-5925 MHz), a bandpass filter unit (e.g., for 3400-3800 MHz), and a low-pass filter unit (e.g., for 1400-2680 MHz). Although not shown, a respective conductive line extends from each respective filter unit to another respective component, such as a switch 406 or transceiver unit 426.

Starting from the top right corner and moving clockwise, a first antenna 430-1 is coupled to a first N-plexer 404-1, and a second antenna 430-2 is coupled to a second N-plexer 404-2. A third antenna 430-3 is coupled to a third N-plexer 404-3, and a fourth antenna 430-4 is coupled to a fourth N-plexer 404-4. A fifth antenna 430-5 is optionally coupled to a filter 402. However, an electronic device may include fewer N-plexers or different number of filters or N-plexers, such as if an antenna 430 is associated with multiple filters or N-plexers. Here, each N-plexer 404 can be implemented using one or multiple filter units and corresponding filter paths extending from each filter unit. Each of the filter units can include, for example, a low pass filter, a high pass filter, or a bandpass filter.

The wireless transceiver 422 includes multiple transceiver units. Specifically, five transceiver units 426-1, 426-2, 426-3, 426-4, and 426-5 are shown. Each respective filter 402 or N-plexer 404 is coupled to at least one respective transceiver unit 426-1 to 426-5. Although five transceiver units 426-1 to 426-5 are shown, the wireless transceiver 422 can include a different number of transceiver units, such as if an antenna 430 and corresponding filter or N-plexer are coupled to more than one transceiver unit 426.

Thus, a network of conductive lines, additional filters or N-plexers, buffers, splitters, switches, and so forth can extend between the filter and N-plexers that are depicted and the multiple transceiver units 426-1 to 426-5 as indicated by network 412. Although the network 412 is only explicitly indicated "on the left" of the wireless transceiver 422, the network 412 may also include such components "on the right" of the wireless transceiver 422. Further, for clarity, additional details of this network 412 are omitted from FIG. 4. However, two switches are explicitly illustrated. A switch 406-1 is coupled between (i) the first N-plexer 404-1 and the second N-plexer 404-2 on one side and (ii) the third transceiver unit 426-3 and the fourth transceiver unit 426-4 on the other side. Also, a switch 406-2 is coupled between (i) the first switched filter 428 and the third N-plexer 404-3 on one side and (ii) the first transceiver unit 426-1 and the second transceiver unit 426-2 on the other side.

Different antennas can be useful for signal diversity, various signal frequencies, different communication technologies, implementing multiple-input multiple output (MIMO) processing for multiple streams, carrier aggregation (CA), beamforming from a particular side of an electronic device, and so forth.

As illustrated, the electronic device 400 includes a first switched filter 428-1 and a second switched filter 428-2. The first switched filter 428-1 is coupled between a first transceiver unit 426-1 and the fifth antenna 430-5. The second switched filter 428-2 is coupled between a fifth transceiver unit 426-5 and the fourth antenna 430-4. The different transceiver units 426-1 and 426-5 may be configured for different frequency bands (and/or different wireless protocols). Each switched filter 428-1 and 428-1 may operate similar to that described above with reference to FIGS. 2-4 but each be configured with a filter 410 having a different frequency response (e.g., notch filters with different rejection bands). Each frequency response may be provided to selectively prevent interference with another band outside the band the respective transceiver unit 426 is operating.

As one example, the first transceiver unit 426-1 may be configured to transmit via a WWAN band (e.g., LTE B40 or NR N40) and the filter 410-1 in the first switched filter 428-1 may be configured with a rejection band covering a WLAN band (e.g., Wi-Fi 2.4 GHz). In this example, the fifth transceiver unit 426-5 may be configured to transmit in another WWAN band (e.g., N79) and the filter 410-2 in the second switched filter 428-2 may be configured with a rejection band covering another WLAN band (e.g., Wi-Fi 5 GHz). Alternatively, the fifth transceiver unit 426-5 may be configured to transmit in a WLAN band (e.g., Wi-Fi 2.4 GHz) while the filter 410-2 in the second switched filter 428-2 may be configured with a rejection band covering a portion of a WWAN band (e.g., LTE B40 or NR N40). Other switched filters (not shown) may be provided as well for different coexistence scenarios.

In another example, a first transceiver unit 426-1 configured for the N79 band may have switched filter 428-1 with a filter 410-1 with a rejection band within a Wi-Fi band at 5 GHz. Likewise, a fifth transceiver unit 426-5 configured for 5 GHz Wi-Fi may have a switched filter 428-2 with a filter 410-2 that has a rejection band within N79 to avoid desensing receiving in the N79 band. A 2.4 GHz second harmonic may also desense receiving in the N79 band, so likewise a fifth transceiver unit 426-5 configured for 2 GHz Wi-Fi may have a switched filter 428-2 with a filter 410-2 that has a rejection band within the N79 band.

With reference to FIGS. 2 and 4, in several scenarios above, the carrier signal is a transmitted signal via the transceiver unit 426-1 and the filter 410 protects an adjacent or other band different from the frequency band within which the carrier signal is operating. However, in other scenarios, the reverse may be true and the filter 410 may be provided to improve the ability to extract a receive signal received via the transceiver unit 426-1. For example, an LTE B40 or NR N40 receive signal may be saturated when in the adjacent 2.4 GHz band, Wi-Fi is transmitting and operating towards the upper end of the 2.4 GHz band. The switched filter controller may detect this scenario and cause the switching circuitry 202 to connect the antenna 430 to the transceiver unit 426-1 using the filtered signal path via the filter 410. This may increase the ability to receive the signal in the LTE B40 or NR N40 band. As LTE B40 or NR N40 may be operated in a time division duplexed (TDD) fashion, the switching circuitry 202 may be configured to toggle the one or more switches synchronously with the TDD cycle (e.g., if for LTE B40 or NR N40 transmission the switched filter is determined to use the bypass signal path but for LTE B40 or NR N40 reception the switched filter is determined to use the filtered signal path then the switching circuitry 202 may toggle the one or more switches synchronously with the TDD cycle between the bypass line 412 and the filter 410). Regardless, the switched filter 428 may be provided for different frequency bands in different scenarios for filtering for either a signal transmitted or received via the transceiver unit 426-1 connected to the switched filter or a signal passing through another transceiver unit 426-2.

Figure 5:
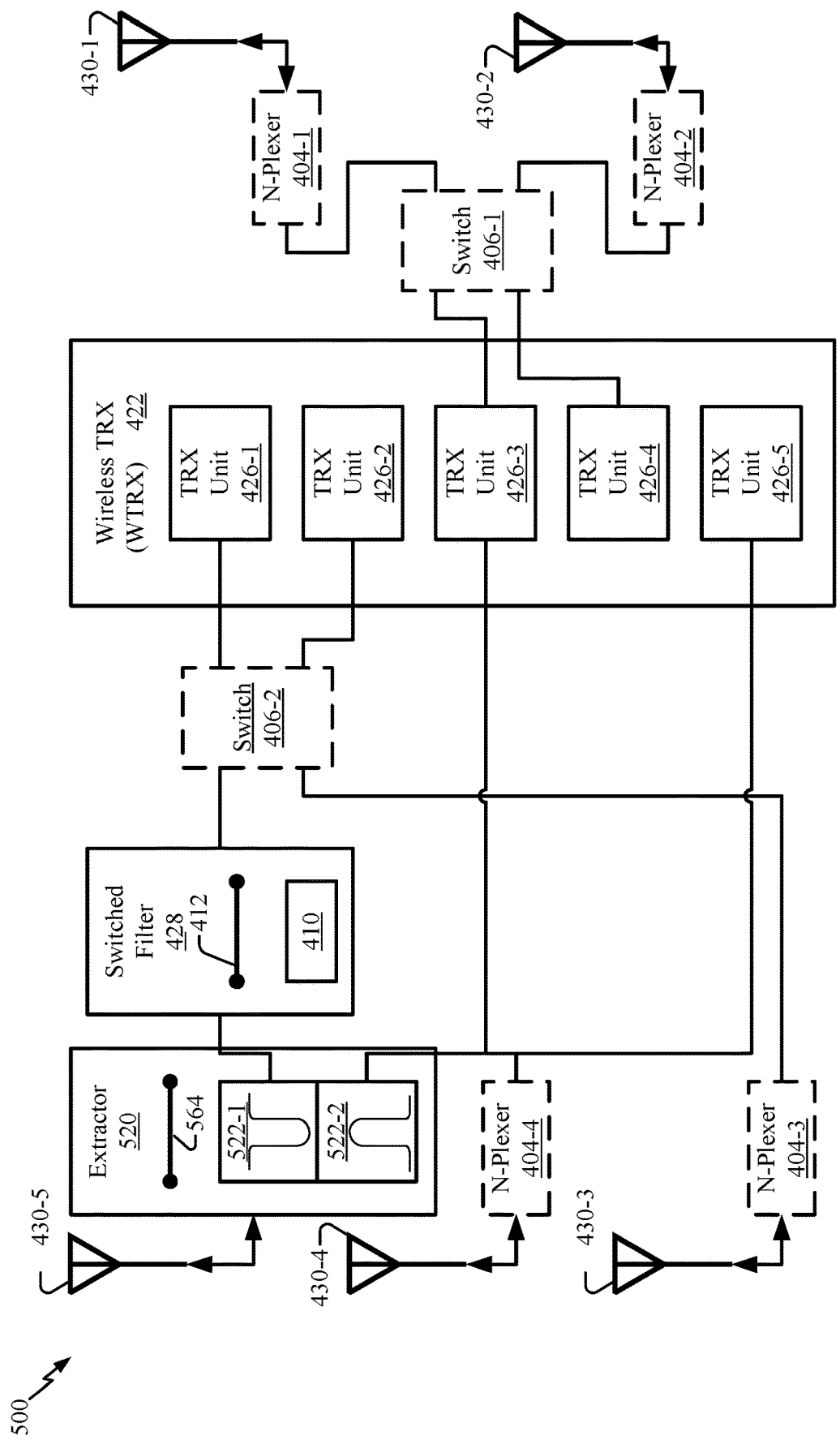
FIG. 5 illustrates a portion of an electronic device having multiple antennas operating with multiple wireless protocols and including a switched filter along with an extractor, in accordance with certain aspects of the present disclosure.

Referring now to FIG. 5, in some scenarios, it may be valuable to use a shared antenna for multiple wireless protocols e.g., such as WWAN and WLAN. An extractor circuit 520 may be used in such a scenario. FIG. 5 illustrates a portion of an electronic device 500 having multiple antennas operating with multiple wireless protocols and including a switched filter along with an extractor circuit 520. The components of FIG. 5 generally are the same as the components as described with FIG. 4 except the second switched filter 428-2 is absent and an extractor 520 is added. The extractor 520 may include at least a first filter 522-1 and a second filter 522-2. The first filter 522-1 may have a band rejection frequency response as illustrated by its frequency response while the second filter 522-2 may be a bandpass filter as illustrated by its respective frequency response. In an aspect, the rejection band of the first filter 522-1 may overlap with the pass band of the second filter 522-2. The extractor 520 may be coupled between the fifth antenna 430-5 and multiple transceivers 426-1 and 426-5. For example, the extractor 520 may be coupled between the fifth antenna 430-5 and the first transceiver unit 426-1 via the first filter 522-1. The extractor 520 is further coupled between the fifth antenna 430-5 and the fifth transceiver unit 426-5 via the second filter 522-1. In one example, the first transceiver unit 426-1 is configured for a WWAN signal while the fifth transceiver unit 426-5 is configured for WLAN signals (e.g., Wi-Fi, Bluetooth, etc.). Alternatively, the fifth transceiver unit 426-5 may be configured for GPS signals. As an example, when the fifth transceiver unit 426-5 is configured for Wi-Fi, the rejection band of the first filter 522-1 and the pass band of the second filter 522-2 may be within the Wi-Fi frequency band (e.g., 2.4 GHz). In this way the WLAN content is extracted from the signal to allow a WWAN signal to be passed through to the first transceiver unit 426-1 without including the WLAN content. And likewise, the WLAN signal is passed through to the fifth transceiver unit 426-4 without including the WWAN signal content. In some aspects, a bypass line 564 can be provided within the extractor 520 to bypass the first and the second filters 522-1 and 522-2 when WLAN is not active or under other conditions.

In combination with the extractor 520, the electronic device 500 further includes a switched filter 428 coupled between the extractor 520 and the transceiver unit 426-1. The switched filter 428 may operate and be configured as described above with reference to FIGS. 2-5. The switched filter 428 may in some implementations have a filter 410 with a similar rejection band as the filter 522-1. However, the sensitivity and performance of the filter 410 within the switched filter 428 may be significantly higher than that for the filter 522-1 (and generally with a higher insertion loss). Particularly, the filter 522-1 may not have sufficient performance to support full coexistence (e.g., as its purpose may be slightly different to enable antenna sharing and may have different characteristics). However, in other scenarios, the switched filter 428 may have different rejection bands or may be a bandpass filter for other bands as compared to the filter frequency bands of the filters 522-1 and 522-2.

Potential ASDIV Challenges

Figure 6:
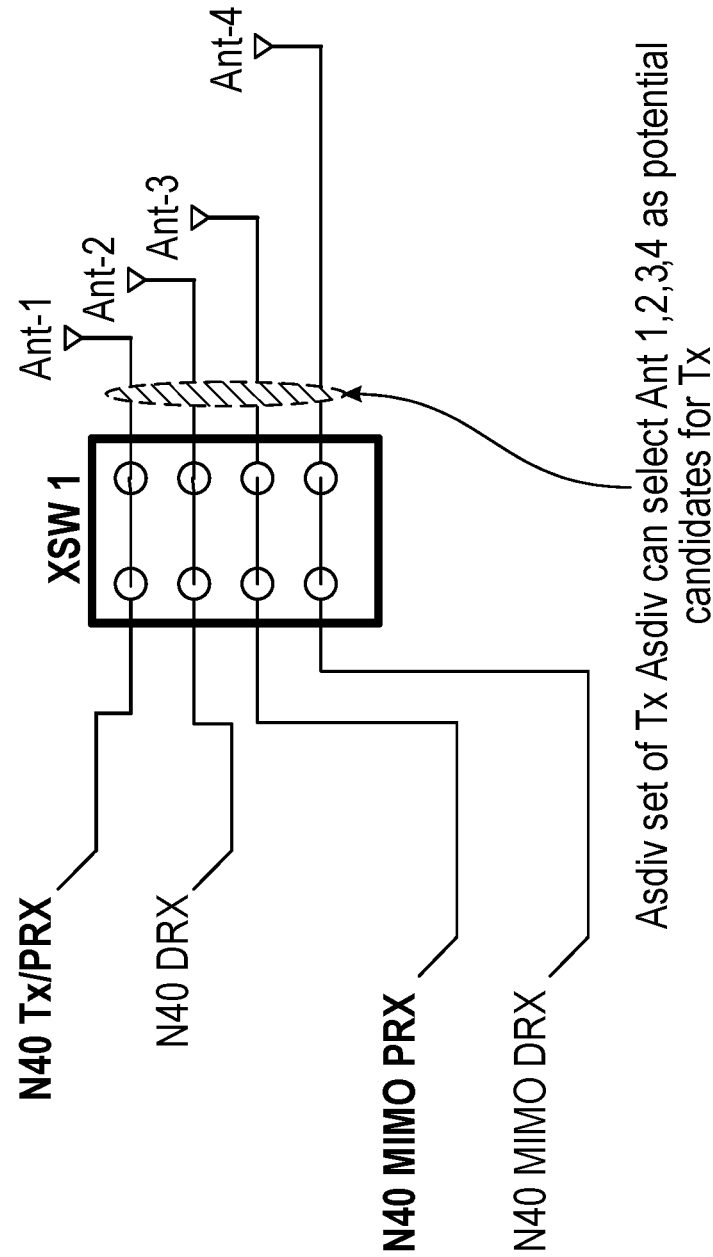
FIG. 6 illustrates an example antenna switch diversity (ASDIV) without using an extractor circuit, in accordance with certain aspects of the present disclosure.

FIG. 6 illustrates an example antenna switch diversity (ASDIV) without using an extractor circuit (such as the extractor 520 of FIG. 5), in accordance with certain aspects of the present disclosure. Without the extractor, the ASDIV example shown in FIG. 6 may not fully support antenna sharing with WLAN 2.4 GHz in ISM or BT networks, along with WWAN networks. For example, the antennas in FIG. 6 may support WWAN RAT, which includes LTE or NR sub-6 licensed band. The WWAN may be in connected mode with Tx and Rx operations. For example, the WWAN may be operating in LTE B40 and/or NR N40. The corresponding spectrum bandwidth is about 2300-2400 MHz. In this band range, interference may occur with 2.4 GHz ISM or near-field networks (e.g., WLAN 2.4 GHz ISM and Bluetooth (BT 2.4 GHz) band). That is, due to the proximity or overlap of cellular and Wi-Fi channels, such as in 2.4- and 5-GHz spectrums for example, using both WLAN and WWAN spectrums may cause interference during operation. For example, LTE B40 or NR N40 (similarly, N41 and N7) are adjacent to 2.4 GHz WLAN spectrums. Similarly, the N79 band is adjacent to the 5-GHz Wi-Fi channel. This may cause signal loss, attenuation, or interference, due to transmit (Tx) leakage and adjacent channel leakage ratio (ACLR) in respective bands. The signal loss may greatly impact data rates if appropriate filtering is not applied. In addition, hardware damage may be possible due to high power signals reaching receive (Rx) paths.

A coexistent network often includes WLAN in Associated mode with an access point (AP), Soft-AP, or peer-to-peer (P2P) mode. These modes can be active in both Tx/Rx operations. For near-field networks, Bluetooth may be used for a connected mode with active Tx and Rx operations. Because WLAN 2.4 GHz and Bluetooth (BT) may typically share the RF front-end module (FEM), one or more aspects of this disclosure addresses coexistent network ("Coex") with WWAN as a general Coex problem with both WLAN 2.4 GHz and BT, even though the radio protocols are different. Other radio access network technology may also employ the techniques disclosed herein.

As an example, the channels in the 2.4-GHz ISM Band have frequency ranges similar to those of NR N40. For example, in the 2.4-GHz ISM band, the frequency space is divided up into 14 channels, numbered 1 through 14. With the exception of channel 14, the channels are spaced 5 MHz apart, from 2412 MHz through 2484 MHz. Therefore, in Coex applications, when WWAN B40/N40 operates in 2370-2400 MHz, WWAN transmissions and receptions may incur signal loss degradation and/or significant desense due to close proximity of B40/N40 (i.e., 2300-2400 MHz) to the 2.4 GHz ISM frequency/spectrum range.

Certain figures described herein show a four antenna design for the B40/N40 band as an example, but such a design may be modified for a different number of antennas in ASDIV applications in different spectrums. For example, the examples herein present an RF front-end topology having four antennas, one of which is for B40N40 and shared with WLAN 2.4 GHz/BT with an RF extractor (such as the extractor circuit 520 of FIG. 5). The RF extractor is configured to enable the diplexing of the WWAN signal path and WLAN 2.4 GHz/BT signal path to share the same antenna. The use of the same antenna and the extractor allows Wifi 2.4 GHz/BT and LTE/NR to coexist on such shared antenna with good noise figure for most part of the B40/N40 spectrum, except for locations near or at the band edge, such as at 2370-2400 MHz. Sharing at least one antenna may also reduce the total number of required antennas, as well as reduce RF front-end BOM/cost or PCB area footprint for a mobile handset supporting cellular and wireless LAN radios.

As discussed above, significant signal attenuation or loss is expected in the 2370-2400 MHz range. Such transmission antenna-path may also experience a high voltage standing wave ratio (VSWR) that could lead to potential device damage and reliability issues. One or more aspects of the present disclosure may address or resolve both problems.

Example ASDIV and SRS Antenna-Switching with RE Channel Based Antenna Constraints for Coexistence Management Between WWAN/WLAN Aspects of the present disclosure provide techniques for a UE to determine if a radio frequency path for network coexistence need be removed from a set of candidate RF paths to avoid signal attenuation.

In some cases, the UE may first determine if an RF signal-path of one or more signal paths for WWAN is using an extractor path. If so, the UE further determines whether the signal attenuation or loss with the WWAN is greater than a threshold value. When the signal attenuation exceeds the threshold value, the UE may remove the RF signal-path having the extractor from the set of RF signal paths for ASDIV antenna selection consideration at the current operating RF channel frequency. The signal attenuation may correspond to a given operating RF channel frequency.

Among various benefits, aspects of the present disclosure may allow one or more ASDIV antenna candidate set to be dynamically adjusted based on operating frequency. If an RF path (or antenna-path) has an RF extractor device for antenna sharing between WWAN and WLAN, large transmission signal attenuation can be avoided for WWAN when at least part of the WWAN and WLAN spectrums overlap. In addition, the present disclosure may prevent potential damage to transmission (Tx) power amplifier (PA) during operation on the shared antenna and its associated RF path with the extractor when a large VSWR at the Tx PA due to a large amount of signals is reflected back to the Tx PA due to the use of the extractor.

Figure 7:
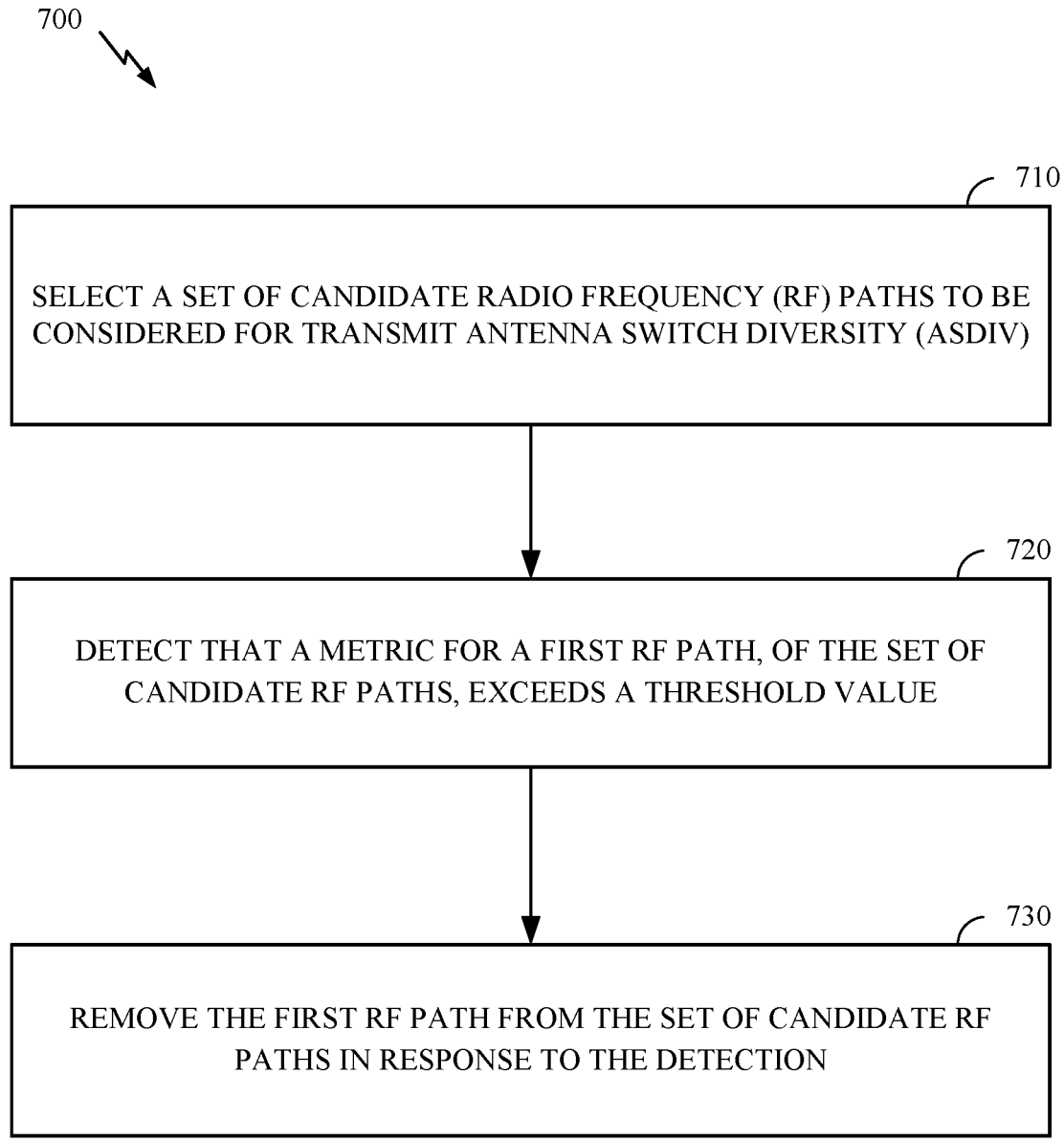
FIG. 7 illustrates example operations for wireless communication by a UE, in accordance with certain aspects of the present disclosure.

FIG. 7 illustrates example operations 700 for detecting and avoiding signal attenuation, noise figure, or power amplification risks, in accordance with certain aspects of the present disclosure. Operations 700 may be performed, for example, by a UE 120 of FIGS. 1 and 2, or any electronic device partially illustrated herein, such as the electronic device of FIGS. 4 and/or 5.

Operations 700 begin, at 710, by selecting a set of candidate radio frequency (RF) paths to be considered for transmit antenna switch diversity (ASDIV). For example, the UE may include a number of antennas configured to provide a set of candidate RF paths to be considered for transmit ASDIV. At 720, the UE detects that a metric for a first RF path, of the set of candidate RF paths, exceeds a threshold value. For example, in some cases, the metric may be at least one of signal attenuation, a noise figure, or an estimated voltage standing wave ratio (VSWR). At 730, the UE removes the first RF path from the set of candidate RF paths in response to the detection.

In certain aspects, the candidate RF paths may be selected via an RF extractor circuit. As noted above, the RF extractor circuit may be operable to perform diplex operations on RF signals of a first radio access network and a second radio access network, the diplex operations including switching between RF signals of the first radio access network and of the second radio access network. An example of such an RF extractor circuit is shown in FIG. 5.

In some cases, the first radio access network comprises a wireless wide-area-network (WWAN). For example, the WWAN comprises at least one of a Long-Term-Evolution (LTE) network or a New Radio (NR) network. The second radio access network comprises a wireless local-area-network (WLAN). The WLAN comprises at least one of an industrial, scientific, and medical (ISM) radio band network or a near-field communication network. In some cases, the first and second radio access networks operate in at least partially overlapping frequency bands.

In certain aspects, the metric includes a measurement of signal attenuation or signal loss. For example, the UE may determine if the signal-path with the RF extractor for the current configured operating RF channel suffers from signal attenuation exceeding a certain threshold (e.g. measured in dB). The determination of the threshold value may be performed under controlled conditions, a-priori, e.g. via measurements of front-end loss at different operating frequency channels.

In certain aspects, the metric includes a measurement of a noise figure. For example, the noise figure, or noise factor, may be used to measure degradation of the signal-to-noise ratio (SNR). The UE may determine if a ratio between an input SNR to an output SNR exceeds a threshold value. Similar to signal attenuation, the determination may also be performed under controlled conditions.

In some cases, the operating logic may be expressed as:
if the measured signal-attenuation in the RF channel with the extractor exceeds a threshold value at current operating RF channel frequency,
then the RF path is excluded from a set of candidate RF paths allowed for consideration for ASDIV,
otherwise (if the measured signal-attenuation does not exceed the threshold value), then all RF paths are allowed for ASDIV consideration.

This type of logic may be used to optimize the set of candidate paths considered when performing ASDIV operations in different scenarios.

For example, FIG. 8 illustrates an example scenario of a moving UE selecting antennas when handed over from a first cell to a second cell, in accordance with certain aspects of the present disclosure. As shown, this example illustrates using the disclosed techniques in a UE mobility scenario when handover is performed between Cell A (a source cell) to Cell B (a target cell).

The illustrated example assumes the UE operates in the N40 channel in Cell A and is configured in the spectrum 2300-2370 MHz (which does not overlap with WLAN 2.4 GHz), the UE performs ASDIV transmission antenna selection, resulting in selecting Antenna 4 from available candidate set of antennas {1, 2, 3, 4}. After handing over to Cell B, the network configures the UE to N40 but in the spectrum 2370-2400 MHz. The UE measures the signal attenuation exceeding a threshold value and removes the Antenna 4 from the candidate set of antennas, as the UE detects that the RF path of Antenna 4 is associated with the extractor. During the handover procedure, the UE may re-evaluate antenna selection from the remaining antenna candidates {1, 2, 3}. An example of evaluating and removing Antenna 4 is illustrated in FIG. 9.

Figure 9:
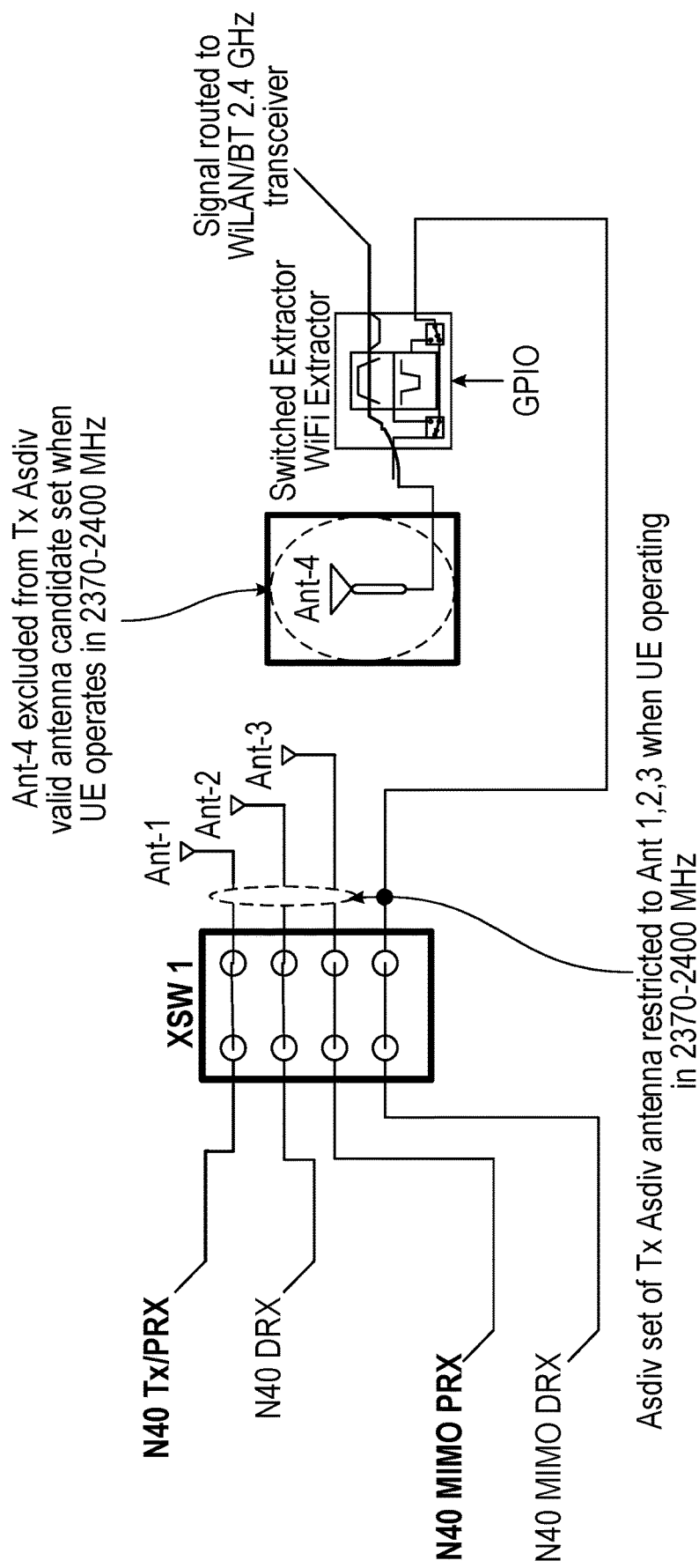
FIG. 9 illustrates an example of ASDIV with one antenna having an extractor shared between two radio networks, in accordance with certain aspects of the present disclosure.

FIG. 9 illustrates an example ASDIV with one antenna having an extractor shared between two radio networks. As shown, the extractor associated with Antenna 4 enables the antenna to be shared between two radio access networks: WWAN N40 MIMO DRX and WLAN 2.4 GHz or BT 2.4 GHz. For example, the extractor allows signals to be routed to WLAN transceiver or N40 MIMO DRX. Thus, when the UE operates at a frequency that has signal attenuation exceeding a threshold value, the UE may remove the RF path of Antenna 4.

In certain aspects, the metric for determining whether to exclude an RF path from an ASDIV candidate set includes an estimated VSWR. The VSWR may be compared to a power amplifier ruggedness specification that is used as the threshold value. When the VSWR is less than or equal to the power amplifier ruggedness specification, the UE allows the RF path of the extractor to remain in the set of RF candidate paths used for transmission ASDIV and sounding reference signal (SRS) antenna switching consideration at the current operating RF channel frequency. When the VSWR exceeds the power amplifier ruggedness specification, such as when the VSWR ratio is greater than Y:1 VSWR, the Y:1 VSWR being the PA ruggedness specification limit, then the UE excludes the use of the RF path of the extractor from the ASDIV and SRS antenna switching that the UE may have been configured.

In some cases, the operating logic may be expressed as:
  if the VSWR is determined to be above a threshold value at the current operating RF channel frequency,
    then the UE excludes the RF path of the extractor from the set of candidate RF paths and the associated antennas to be considered for ASDIV and SRS antenna switching operations,
  otherwise, if the VSWR is determined to be equal to or less than the threshold value, then the UE allows all RF paths of the set of candidate RF paths to be considered for ASDIV and SRS antenna switching.

This type of logic may also be used to optimize the set of candidate paths considered when performing ASDIV operations in different scenarios.

In some cases, the VSWR may be determined based on an offline characterization or offline measurements. For example, the VSWR is measured based on a variation of the operating frequency channel and the transmission power. The measurements may be used to identify a function or relationship between the variables and output, and/or be used to create a look-up-table to identify a predicted measurement given certain frequency channel and transmission power.

In some cases, the VSWR may be determined based on real-time measurements of the VSWR, such as by using feedback reception (FBRX) measurements (e.g., by using a coupler device to sense the signal coupled to the transmission device). For example, by using FBRX measurements to determine the VSWR ratio for the current operating channel, the real-time VSWR can be determined. In some cases, the real-time measurements may be periodic measurements and may be filtered or averaged for the VSWR determination or estimation.

Figure 10:
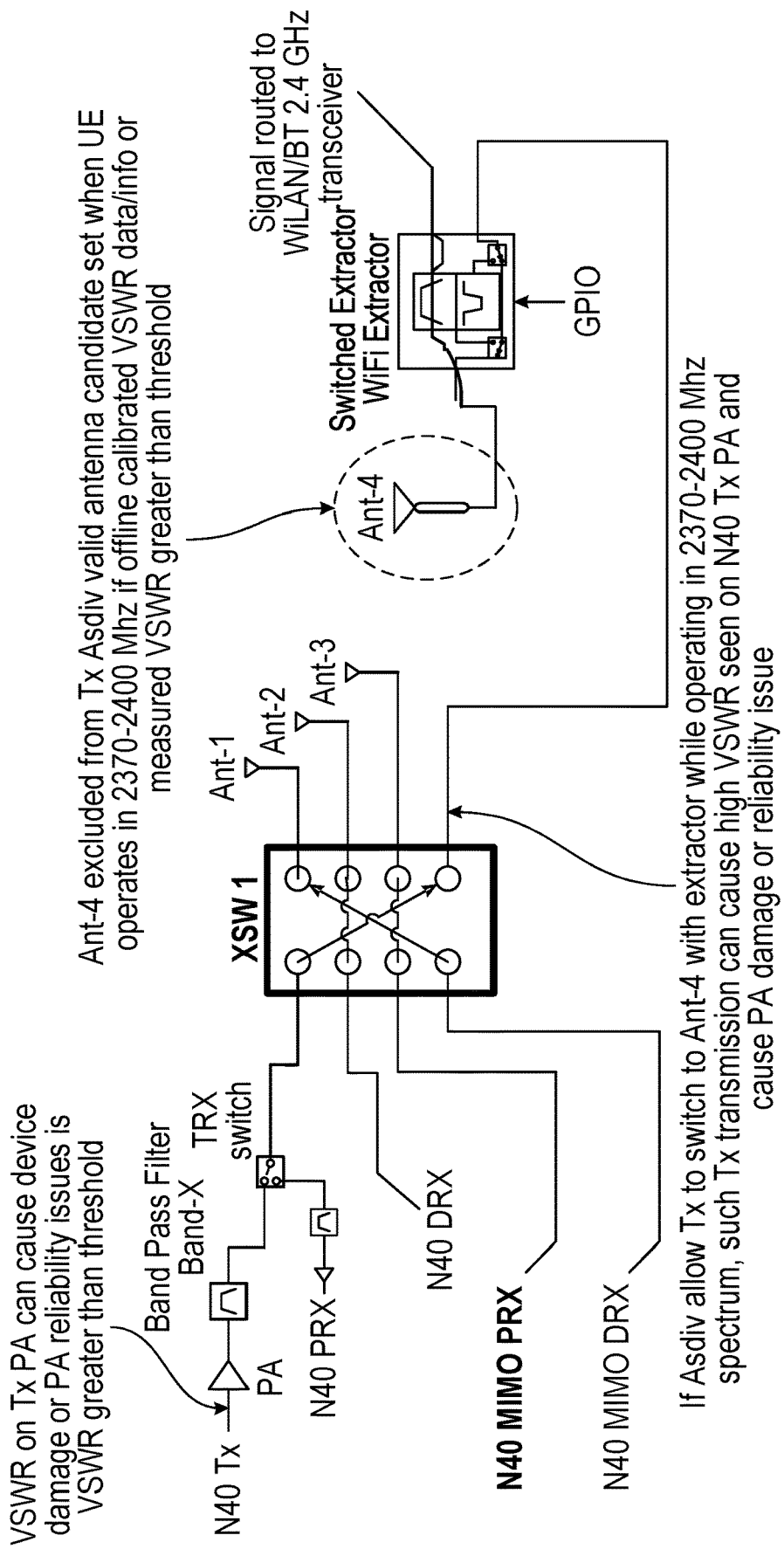
FIG. 10 illustrates an example of ASDIV with a selected radio frequency (RF) path, in accordance with certain aspects of the present disclosure.

FIG. 10 illustrates an example ASDIV with a selected radio frequency (RF) path, in accordance with certain aspects of the present disclosure. As shown, a switch extractor is coupled to the Antenna 4 for handling both WWAN (e.g., NR N40 or LTE B40) and WLAN 2.4 GHz or BT 2.4 GHz. Such configuration allows the ASDIV antenna candidate set to be dynamically adjusted based on the operating frequency. However, when the operating frequency is in the range 2370-2400 MHz, where partial overlap or interference of the WWAN and WLAN may occur and cause the VSWR to increase beyond the threshold value, the WWAN (e.g., N40) may then be restricted to the Antennas {1, 2, 3} only and the UE may exclude Antenna 4 connected with the extractor from the set of antenna candidates for ASDIV or SRS antenna switching operations. This allows the UE to avoid large transmission signal attenuation for WWAN when operating in the spectrum where the coexistent network may partially overlap. Furthermore, the UE may avoid potential transmission power amplification damages if operating on such RF path with the extractor may cause a large VSWR at the transmission PA due to a large amount of signals being reflected back to the transmission PA when the extractor is used. Although examples are provided as N40, other spectrums may also use the techniques disclosed herein.

Figure 11:
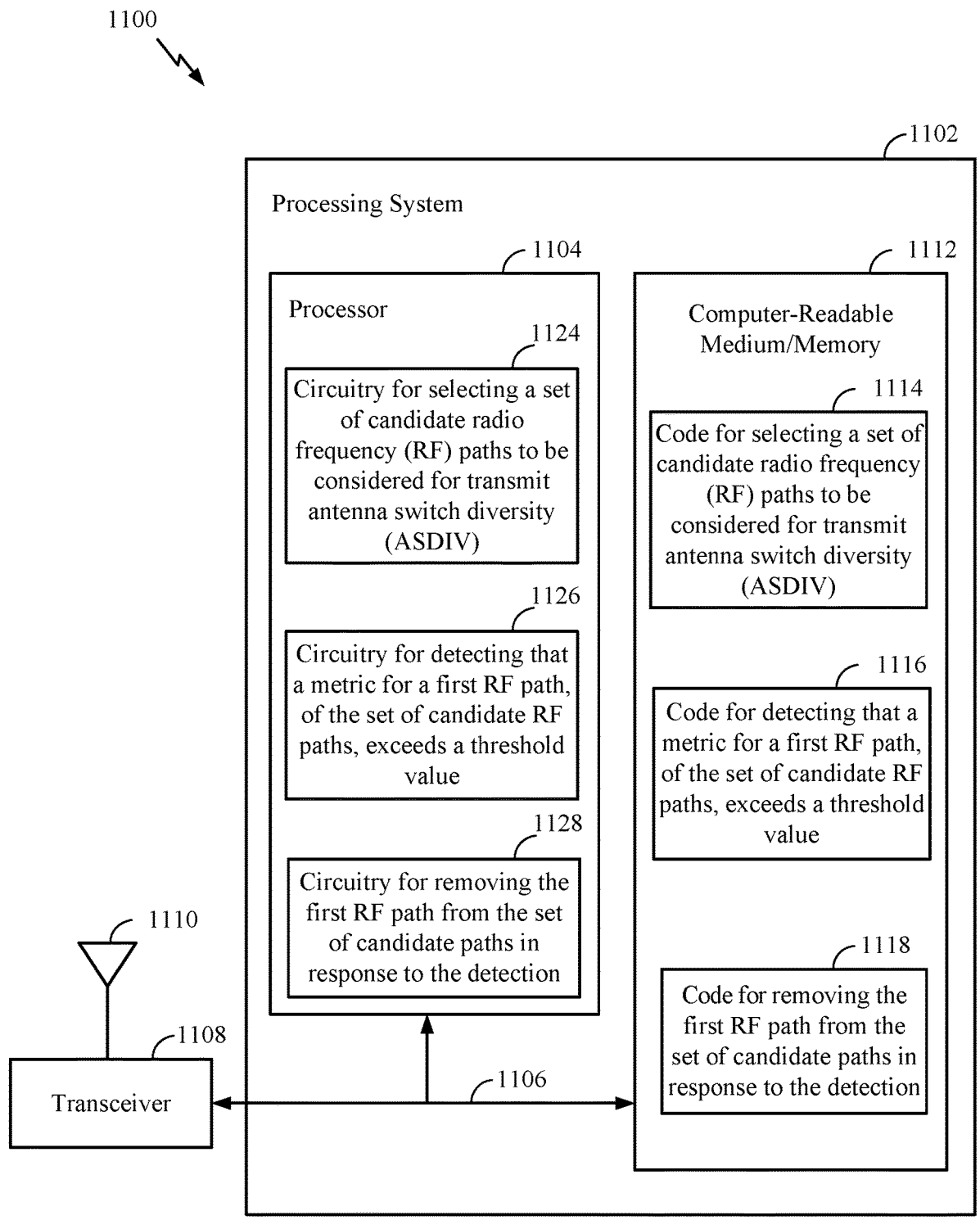
FIG. 11 illustrates a communications device that may include various components configured to perform operations for the techniques disclosed herein, in accordance with aspects of the present disclosure.

FIG. 11 illustrates a communications device 1100 (e.g., a first UE) that may include various components (e.g., corresponding to means-plus-function components) configured to perform operations for the techniques disclosed herein, such as the operations 700 illustrated in FIG. 7. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations 700 illustrated in FIG. 7, or other operations for performing the various techniques discussed herein. In certain aspects, computer-readable medium/memory 1112 stores code 1114 for selecting a set of candidate radio frequency (RF) paths to be considered for transmit antenna switch diversity (ASDIV), code 1116 for detecting that a metric for a first RF path, of the set of candidate RF paths, exceeds a threshold value, and code 1118 for removing the first RF path from the set of candidate paths in response to the detection. In certain aspects, the processor 1104 has circuitry configured to implement the code stored in the computer-readable medium/memory 1111. The processor 1104 includes circuitry 1124 for selecting a set of candidate RF paths to be considered for transmit ASDIV, circuitry 1126 for detecting that a metric for a first RF path, of the set of candidate RF paths, exceeds a threshold value, and circuitry 1128 for removing the first RF path from the set of candidate paths in response to the detection.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various processor shown in FIG. 2 may be configured to perform operations 700 of FIG. 7.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIG. 7).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. An apparatus for wireless communication, comprising:
a memory; and
a processor coupled to the memory, wherein the processor is configured to:
select a set of candidate radio frequency (RF) paths to be considered for transmit antenna switch diversity (ASDIV);
detect that a voltage standing wave ratio (VSWR) for a first RF path of the set of candidate RF paths exceeds a threshold value; and
determine whether to remove or maintain the first RF path from the set of candidate RF paths in response to the detection.

2. The apparatus of claim 1, wherein, to determine whether to remove or maintain the first RF path from the set of candidate RF paths in response to the detection, the processor is configured to:
remove the first RF path if the VSWR exceeds the threshold value; or
maintain the first RF path if the VSWR is less than or equal to the threshold value.

3. The apparatus of claim 1, wherein the threshold value is based on power amplifier ruggedness.

4. The apparatus of claim 3, wherein the set of candidate RF paths are for ASDIV and sounding reference signal (SRS) antenna switching.

5. The apparatus of claim 1, wherein at least one of the set of candidate RF paths is selected via at least one RF extractor circuit.

6. The apparatus of claim 5, wherein the at least one RF extractor circuit is operable to perform diplex operations to switch between RF signals of a first radio access network (RAN) and RF signals of a second RAN.

7. The apparatus of claim 5, wherein:
the set of candidate RF paths are enabled by two or more antennas, wherein at least one of the two or more antennas is connected to the at least one RF extractor circuit.

8. The apparatus of claim 7, wherein the two or more antennas comprise at least four antennas configured to perform the ASDIV.

9. The apparatus of claim 5, wherein the at least one RF extractor circuit is configured to receive RF signals from at least a first radio access network (RAN) or a second RAN.

10. The apparatus of claim 9, wherein the first RAN comprises a wireless wide-area-network (WWAN).

11. The apparatus of claim 10, wherein the WWAN comprises at least one of a Long-Term-Evolution (LTE) network or a New Radio (NR) network.

12. The apparatus of claim 11, wherein the first and second RAN operate in at least partially overlapping frequency bands.

13. The apparatus of claim 9, wherein the second RAN comprises a wireless local-area-network (WLAN).

14. The apparatus of claim 13, wherein the second RAN comprises at least one of:
an industrial, scientific, and medical (ISM) radio band network;
a near-field communication network; or
a short-range network.

15. The apparatus of claim 10, wherein the second RAN comprises a wireless local-area-network (WLAN).

16. The apparatus of claim 1, wherein the VSWR is an estimated VSWR.

17. The apparatus of claim 1, wherein the first RF path includes an RF extractor circuit.

18. The apparatus of claim 17, wherein, to determine whether to remove or maintain the first RF path from the set of candidate RF paths in response to the detection, the processor is configured to:
cause the RF extractor circuit to remove the first RF path if the VSWR exceeds the threshold value; or
cause the RF extractor circuit to maintain the first RF path if the VSWR is less than or equal to the threshold value.

19. An apparatus for wireless communication, comprising:
a memory; and
a processor coupled to the memory, wherein the processor is configured to:
select a set of candidate radio frequency (RF) paths to be considered for transmit antenna switch diversity (ASDIV);
detect whether a voltage standing wave ratio (VSWR) for a first RF path of the set of candidate RF paths exceeds a threshold value; and
determine whether to remove or maintain the first RF path from the set of candidate RF paths in response to the detection.

20. The apparatus of claim 19, wherein, to determine whether to remove or maintain the first RF path from the set of candidate RF paths in response to the detection, the processor is configured to:
remove the first RF path if the VSWR exceeds the threshold value; or
maintain the first RF path if the VSWR is less than or equal to the threshold value.

21. The apparatus of claim 19, wherein, to determine whether to remove or maintain the first RF path from the set of candidate RF paths in response to the detection, the processor is configured to:
remove the first RF path if the VSWR exceeds the threshold value.

22. The apparatus of claim 19, wherein, to determine whether to remove or maintain the first RF path from the set of candidate RF paths in response to the detection, the processor is configured to:
maintain the first RF path if the VSWR is less than or equal to the threshold value.

23. The apparatus of claim 19, wherein the VSWR is an estimated VSWR.

24. The apparatus of claim 19, wherein the first RF path includes an RF extractor circuit.

25. The apparatus of claim 24, wherein, to determine whether to remove or maintain the first RF path from the set of candidate RF paths in response to the detection, the processor is configured to:
cause the RF extractor circuit to remove the first RF path if the VSWR exceeds the threshold value; or
cause the RF extractor circuit to maintain the first RF path if the VSWR is less than or equal to the threshold value.

26. The apparatus of claim 24, wherein, to determine whether to remove or maintain the first RF path from the set of candidate RF paths in response to the detection, the processor is configured to:
cause the RF extractor circuit to remove the first RF path if the VSWR exceeds the threshold value.

27. The apparatus of claim 24, wherein, to determine whether to remove or maintain the first RF path from the set of candidate RF paths in response to the detection, the processor is configured to:
cause the RF extractor circuit to maintain the first RF path if the VSWR is less than or equal to the threshold value.

28. The apparatus of claim 19, wherein the threshold value is based on power amplifier ruggedness.

29. The apparatus of claim 28, wherein the set of candidate RF paths are for ASDIV and sounding reference signal (SRS) antenna switching.

30. An apparatus for wireless communication, comprising:
a memory; and
a processor coupled to the memory, wherein the processor is configured to:
detect whether a voltage standing wave ratio (VSWR) for a first radio frequency (RF) path of a set of candidate RF paths exceeds a threshold value; and
determine whether to remove or maintain the first RF path from the set of candidate RF paths in response to the detection.

31. The apparatus of claim 30, wherein, to determine whether to remove or maintain the first RF path from the set of candidate RF paths in response to the detection, the processor is configured to:
remove the first RF path if the VSWR exceeds the threshold value; or
maintain the first RF path if the VSWR is less than or equal to the threshold value.

32. The apparatus of claim 30, wherein, to determine whether to remove or maintain the first RF path from the set of candidate RF paths in response to the detection, the processor is configured to:
remove the first RF path if the VSWR exceeds the threshold value.

33. The apparatus of claim 30, wherein, to determine whether to remove or maintain the first RF path from the set of candidate RF paths in response to the detection, the processor is configured to:
maintain the first RF path if the VSWR is less than or equal to the threshold value.

34. The apparatus of claim 30, wherein the VSWR is an estimated VSWR.

35. The apparatus of claim 30, wherein the first RF path includes an RF extractor circuit.

36. The apparatus of claim 35, wherein, to determine whether to remove or maintain the first RF path from the set of candidate RF paths in response to the detection, the processor is configured to:
cause the RF extractor circuit to remove the first RF path if the VSWR exceeds the threshold value; or
cause the RF extractor circuit to maintain the first RF path if the VSWR is less than or equal to the threshold value.

37. The apparatus of claim 35, wherein, to determine whether to remove or maintain the first RF path from the set of candidate RF paths in response to the detection, the processor is configured to:
cause the RF extractor circuit to remove the first RF path if the VSWR exceeds the threshold value.

38. The apparatus of claim 35, wherein, to determine whether to remove or maintain the first RF path from the set of candidate RF paths in response to the detection, the processor is configured to:
cause the RF extractor circuit to maintain the first RF path if the VSWR is less than or equal to the threshold value.

39. The apparatus of claim 30, wherein the threshold value is based on power amplifier ruggedness.

40. The apparatus of claim 30, wherein the set of candidate RF paths are for transmit antenna switch diversity (ASDIV).

41. The apparatus of claim 30, wherein the set of candidate RF paths are for transmit antenna switch diversity (ASDIV) and sounding reference signal (SRS) antenna switching.

* * * * *